United States Patent [19]
Whittaker et al.

[11] Patent Number: 5,642,486
[45] Date of Patent: Jun. 24, 1997

[54] INVALIDATION QUEUE WITH "BIT-SLICEABILITY"

[75] Inventors: Bruce E. Whittaker, Mission Viejo; David M. Kalish, Laguna Niguel; Saul Barajas, Mission Viejo, all of Calif.

[73] Assignee: Unisys Corporation, Blue Bell, Pa.

[21] Appl. No.: 92,433

[22] Filed: Jul. 15, 1993

[51] Int. Cl.$^6$ ...................................................... G06F 12/08
[52] U.S. Cl. ........................... 395/250; 395/468; 395/872; 395/448; 395/445
[58] Field of Search ................................ 364/200 MS File, 364/900 MS File; 395/400, 425, 468, 470, 471, 472, 473, 405, 431, 497.04, 475, 485, 467, 250, 872, 444, 445, 447, 448

[56] References Cited

U.S. PATENT DOCUMENTS

| | | | |
|---|---|---|---|
| 5,226,146 | 7/1993 | Milia et al. | 395/425 |
| 5,265,232 | 11/1993 | Gannon et al. | 395/425 |
| 5,339,399 | 8/1994 | Lee et al. | 395/425 |
| 5,398,325 | 3/1995 | Chang et al. | 395/425 |

*Primary Examiner*—Eddie P. Chan
*Assistant Examiner*—Hiep T. Nguyen
*Attorney, Agent, or Firm*—John J. McCormack; Mark T. Starr

[57] ABSTRACT

An Invalidation Queue (IQ) arrangement in a computer system having Main Memory and, Cache-Memory, with a pair of intermediate main-buses this IQ arrangement comprising: a pair of split IQ ASIC Arrays disposed between each Cache-Memory and the main-buses and being adapted to assure identical data in all identical memory addresses in different caches, and to "remember" write-operations along the buses and to execute invalidation sequences for any Cache-Memory unit as dictated by that Cache-Memory unit.

2 Claims, 6 Drawing Sheets

INVALIDATION QUEUE WITH "BIT-SLICEABILITY"

This invention relates to data processing systems, and especially to a high efficiency invalidation queue structure for cache memory therein.

BACKGROUND, FEATURES

In a computer system having more than one memory storage facility, a special data integrity challenge can occur. Any computer system having both a main-memory structure and cache-memory(s) is in such a situation (e.g. see System I in FIG. 1, having Main Memory linked by system bus means to a number of Processors, 1,2 ... N, each with an associated Cache Memory). The potential problem that should be faced is that of maintaining "data coherency," i.e., assuring that all copies of information (data) are identical for a given specific address (in all memory facilities—a "data integrity" problem.

If computer processors only read data from the memories, this problem would never occur, but, then, little productive work would take place either. Real processors must also modify the values of data that is stored in the system's memories. This is usually referred to as writing memory, or as doing an "overwrite" operation. Some systems provide for several types of write operations. No matter what varieties of write operations are used, the central problem of data coherency arises any time data in one of several memory facilities has been modified.

Most computer systems with cache memories maintain data integrity using an "Invalidation" scheme. This technique requires each cache-memory module to monitor (or spy-upon) the memory operations of all other processors in the system. When any memory "data write" operation is detected, then each of the cache-memories must plan for a potential invalidation operation within its own cache memory. An invalidation operation entails checking the contents of (its own) cache memory for the specific address of the write operation that was detected. If a local cache-memory module discovers that it indeed does contain this (same) address, it must then mark this address as no longer valid, since some other processor is overwriting its previous value.

This invalidation process, itself, presents a problem for the cache memory module and its associated processor, since it uses of cache memory resources. These resources are, of course, present to assist the processor in its work, but the invalidation process may make them "busy" and so hinder the processor from getting its regular work done.

It would be desirable therefore to remember the information necessary for a specific invalidation and execute the process at the least inconvenient time—such is an object hereof.

A second motivation for some sort of remembering device for invalidation data is that the "spying," or monitoring of bus activity, may involve numerous write conditions, and doing so very quickly lest one delay other processors in the system. Therefore, each spy, or cache, must remember all the possible invalidation information for execution at some later time. This we also propose here.

Such a novel "remembering mechanism," is described here—and, for the sake of this discussion, it is called an "INVALIDATION QUEUE" (IQ). The IQ queue structure must take-in, and hold, all pertinent informs,ion regarding all memory write operations in the system. It must then provide for the convenient unloading of this information for the invalidation process at the discretion of the local cache-memory module.

This disclosure presents such an INVALIDATION QUEUE structure; along with several special related features to greater facilitate the efficient handling of invalidation information at the least cost in overall performance of the computer system.

Thus, an object hereof is to address at least some of the foregoing problems and to provide at least some of the mentioned, and other, advantages.

BRIEF DESCRIPTION OF THE DRAWINGS

These and other features and advantages of the present invention will be appreciated by workers as they become better understood by reference to the following detailed description of the present preferred embodiments which should be considered in conjunction with the accompanying drawings, wherein like reference symbols denote like elements:

FIG. 5 is a functional showing of a like Queue (a "Spy Queue") while

OVERVIEW OF INVENTION

Our "invalidation queue" mechanism is called-upon since write operations can occur on the system buses faster than the cache invalidation processes can be executed (without the queuing mechanism.)

Figure 2:
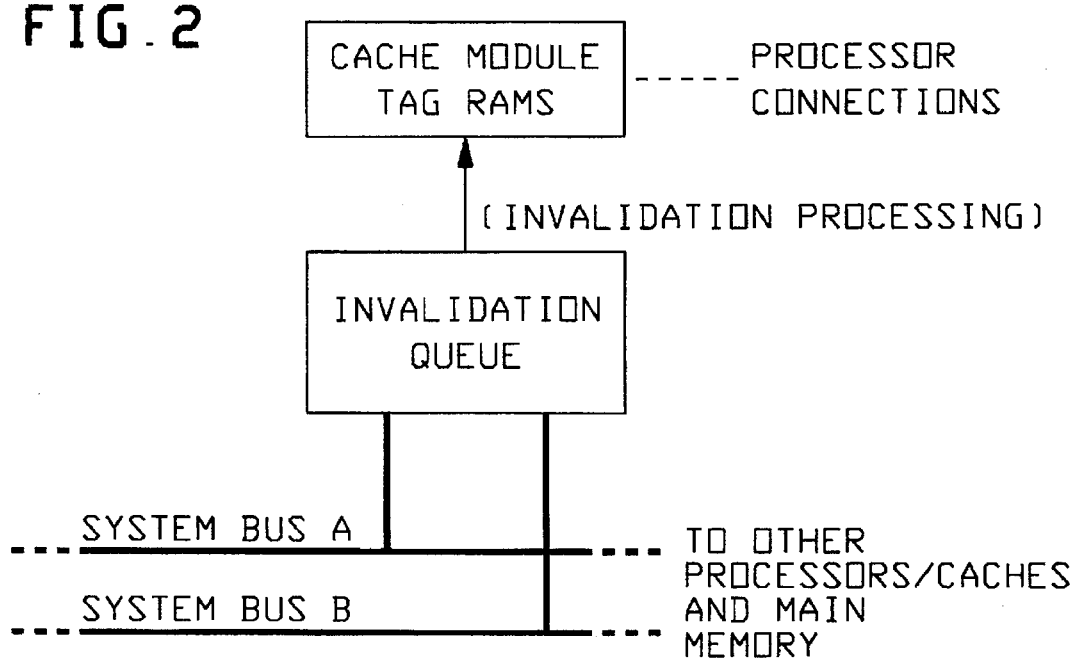
FIG. 2 is a block diagram of an Invalidation Queue made part of a cache like those in FIG. 1.

Our "Invalidation Queue" IQ structure provides a path between (i.e. couples) a pair of main system buses (here, denoted as buses A and B) and cache memory module tag RAM resources, CM-RAM (FIG. 2 shows this). Of course, systems with two or more buses will be more fault-tolerant (e.g. redundancy), easier to maintain and to "split".

Figure 1:
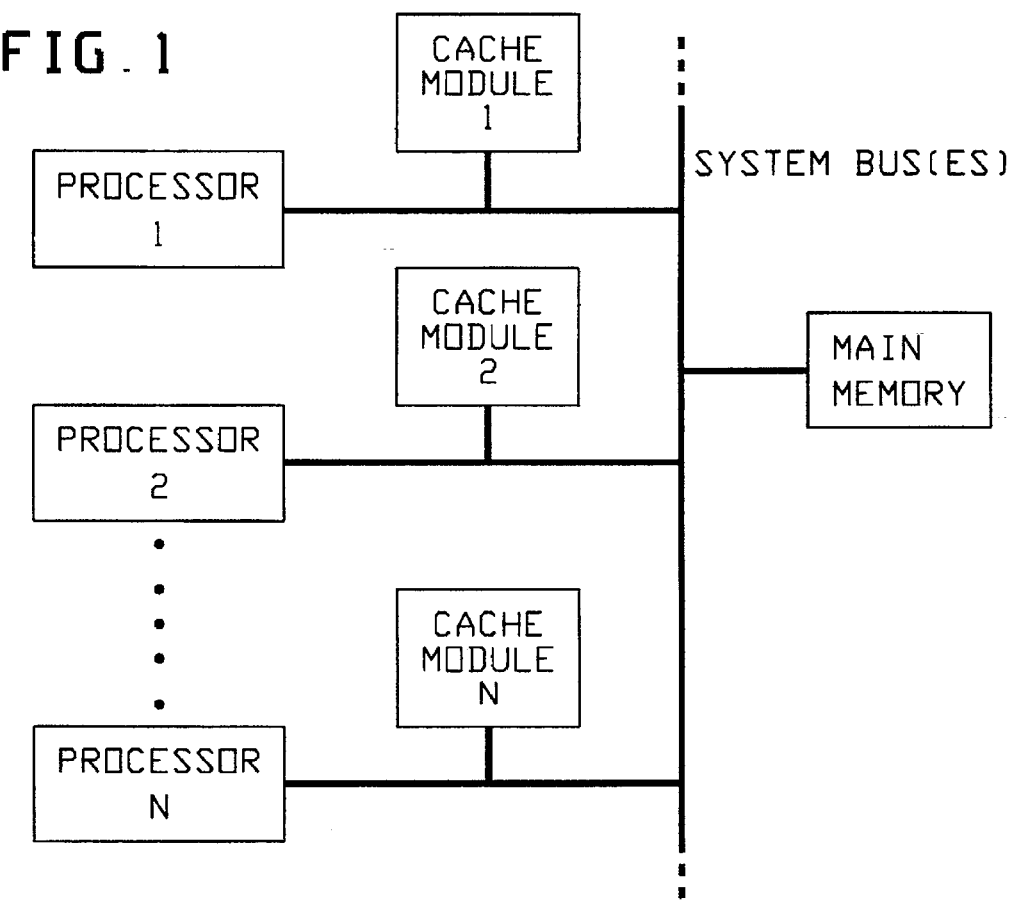
FIG. 1 a propaedeutic showing of a multi-memory, multi-processor computer system.
Figure 3:
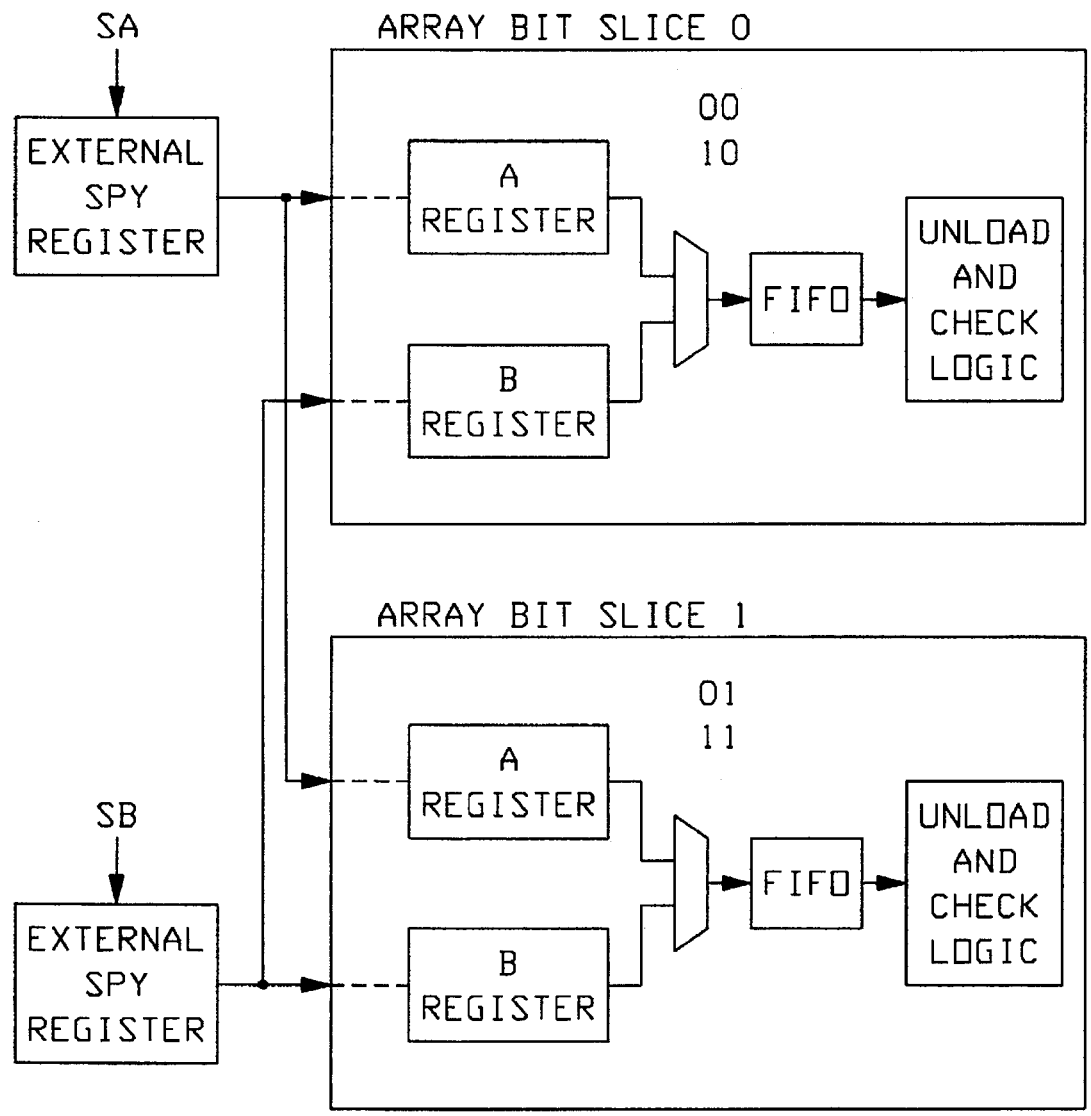
FIG. 3 is a more detailed diagram of such a Queue made according to a preferred "bit-sliced" embodiment hereof; with FIG. 3A further detailing one of the two "slices" thereof.

FIG. 2 is a block diagram of an Invalidation Queue, etc., as mentioned for inclusion in a Cache Memory module as shown in FIG. 1. FIG. 3 shows a n, ore detailed description of a preferred "Invalidation Queue" implementation in block diagram form. Here, it is seen that information SA, SB from incoming write operations on each system, bus, (SA on bus A, SB on bus B) must first be captured in a respective "External Spy Register" FSR-A, ESR-B one for each bus. These provide two important features:

First, the information on a respective system bus must be captured in a very fast register which is located very close to the bus connection—to meet bus timing restraints.

Secondly, the clock (frequencies) of the system buses and the cache module are asynchronous (i.e. not synchronous with one another); hence the "External Spy Register" on each bus will preferably provide clock synchronization as well (preferably via separate PAL).

FIG. 3 also shows that the remainder of the "Invalidation Queue" structure as implemented within two large ASIC gate arrays A-0, A-1. In fact, most of the cache module is also preferably implemented in these arrays. [Prefer MOS-type ASIC] To provide a sufficiently large cache memory module (to give the required processor performance), we "split" the cache module and its "Invalidation Queue" between the two ASIC arrays, structuring them in a "bit-sliced" method. That is, one-half of the "slice" (one array) handles one-half of the possible memory addresses: (e.g. A-0). The second "slice" (the other array) handles the other half of the addresses (e.g. A-1).

Each of the bit slices (cache arrays) must "spy upon" both of the system buses, A and B. Therefore, each of the cache arrays (bit slices) receives the outputs from both of the "External Spy Registers"—described above. As FIG. 3 then shows, these inputs are then held in respective holding registers, called "A-Register" and "B-Register" in each ASIC array. When the appropriate register in the appropriate ASIC array is loaded from the appropriate "External Spy Register," ESR, thorn that ESR is free to continue its task of monitoring its system bus.

The "A-Register" and "B-Register" are then steered to a "First-in, First-out" (FIFO) queue structure of the "Invalidation Queue" structure. Once the FIFO is loaded with the bus write information, that register is also freed for new incoming information. Thus, we have a "pipe-lining" structure: with "External Spy Registers" feeding the specific "n-Registers" for the appropriate bus and array. These, in turn, feed the appropriate FIFO.

The "pipe-lining" plus the "bit-slicing" allows the "Invalidation Queue" to handle two high-speed system buses without degrading (slowing down) performance of a system bus, and without "losing" an invalidation operation (no invalidation performed).

SIZE OF THE INVALIDATION QUEUE

The queue must be wide enough to hold all information needed for a write operation on the buses. It must be deep enough to hold sufficient "writes" and so minimize the effect of invalidation on processor work, while assuring that no "writes" will be lost.

If the queue depth is made too small (i.e. not enough "writes" are held), then it will fill up too quickly. When the queue becomes full, invalidation executions become mandatory and normal processor-work must cease until the invalidation work is done and the queue is no longer full. Also when the queue become full, there is increased danger of losing a "write" on the system bus. Such a situation is catastrophic to the system (data coherency is lost).

Another consequence of "queue full" is that each time new "write" is detected on either system bus, it must be "retried" (i.e. repeated later) since there is no room in the queue. This means that the source module of that write operation has to repeat the entire operation at some later time, hoping that by then the queue will have room fur the new invalidation. The "retrying" mechanism can significantly slow down data flow on the buses. It can, in fact, be so detrimental that no other useful work can proceed meanwhile.

It could be argued that the queue can be made "very deep" to prevent such conditions. However, too deep a queue is also undesirable since queue structures are expensive, both in hardware cost and in chip space ("real estate"). Also, the deeper a queue, the more extensive and complicated becomes its supporting control logic.

It is therefore highly desirable that queue storage be correctly sized and be used very efficiently.

The queue mechanism presented herein uses a "data-compression" scheme to allow more effective address information to be held in queue hardware that is down-sized.

"ADDRESS COMPRESSION" FEATURE

Figure 4:
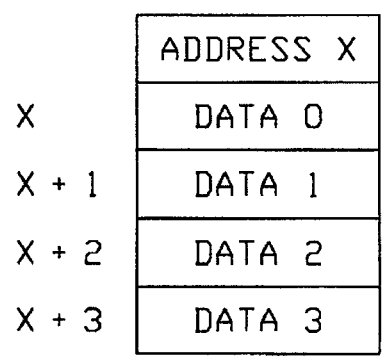
FIG. 4 is a functional representation of data blocks (addresses) for such a Queue.

FIG. 4 will be understood to indicate that many of the system bus write operations involve "blocks" of data information. That is, each address (e.g. x) actually represents four data words (a block x, x+1, x+2, x+3) in memory. The Input/Output (I/O) substrates, especially fills memory from I/O peripheral devices using "memory block" type of write operations. Note, in the Unisys: A-11 computer system this operation is called a "New Data Overwrite" (NDOW), and it always presents such a four word block of data for each address.

Figure 5:
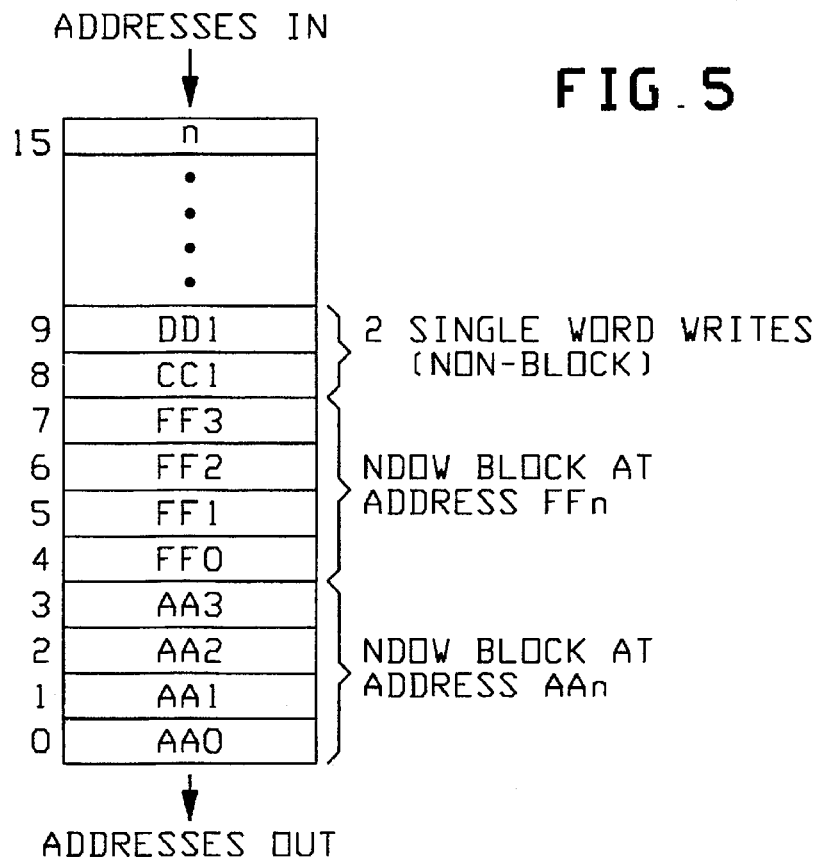

FIG. 5 shows a spy queue without our Address-Compression (data compression) feature. Here, only four (4) system bus operations have occurred and yet 10 of the 16 positions in the queue have been filled. FIG. 5 shows that two "block type" writes (NDOW) have occurred, followed by two single word type writes.

Since a block type operation does represent four real addresses in memory, all four of these addresses must be checked (spy'd upon) in each cache module. Therefore, without our data compression feature, all four of these addresses must be placed in the "invalidation queue" to be checked.

Figure 6:
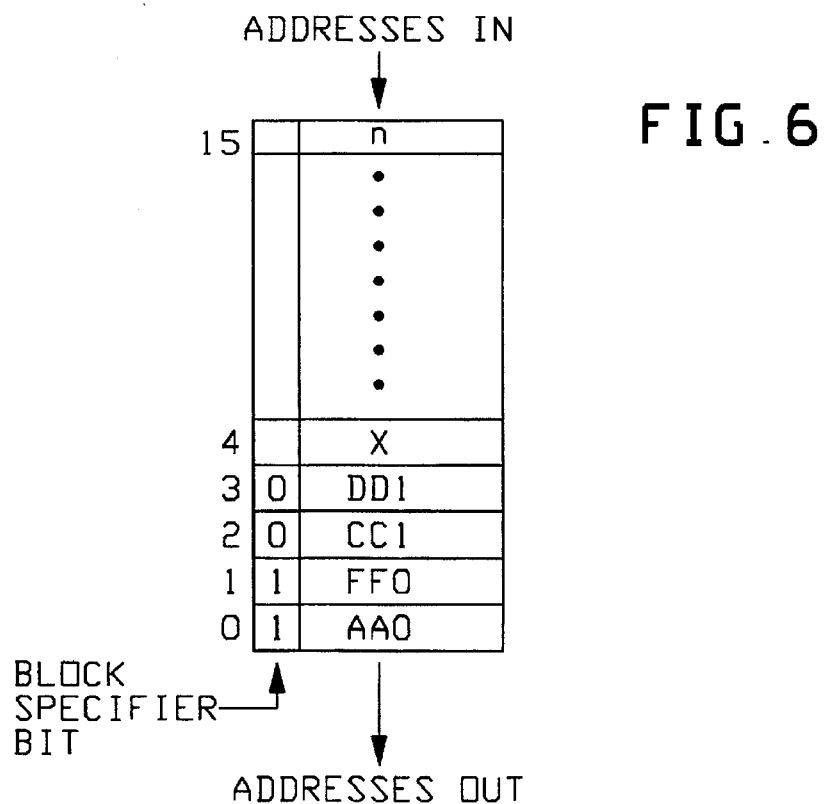
FIG. 6 shows the same as modified by Address Compression as here contemplated.

FIG. 6 shows the same sample system bus operation sequence, but using the Address-Compression feature of this invention. Here a special bit, called the "Block Specifier," (BS-bit) is used within the queue to indicate whether the address given is a single word or a block type. In this sample sequence, it will be understood that our data compression method uses only four queue locations, as opposed to ten (10) locations used more conventionally (e.g. as in FIG. 5). This feature greatly helps prevent the queue structure going to a "Full" condition too quickly.

The compressed data format in the queue saves room in the queue storage; however, it does require extra effort when the address (the compressed address) is unloaded from the queue to check against the cache TAG RAM.

Figure 3A:
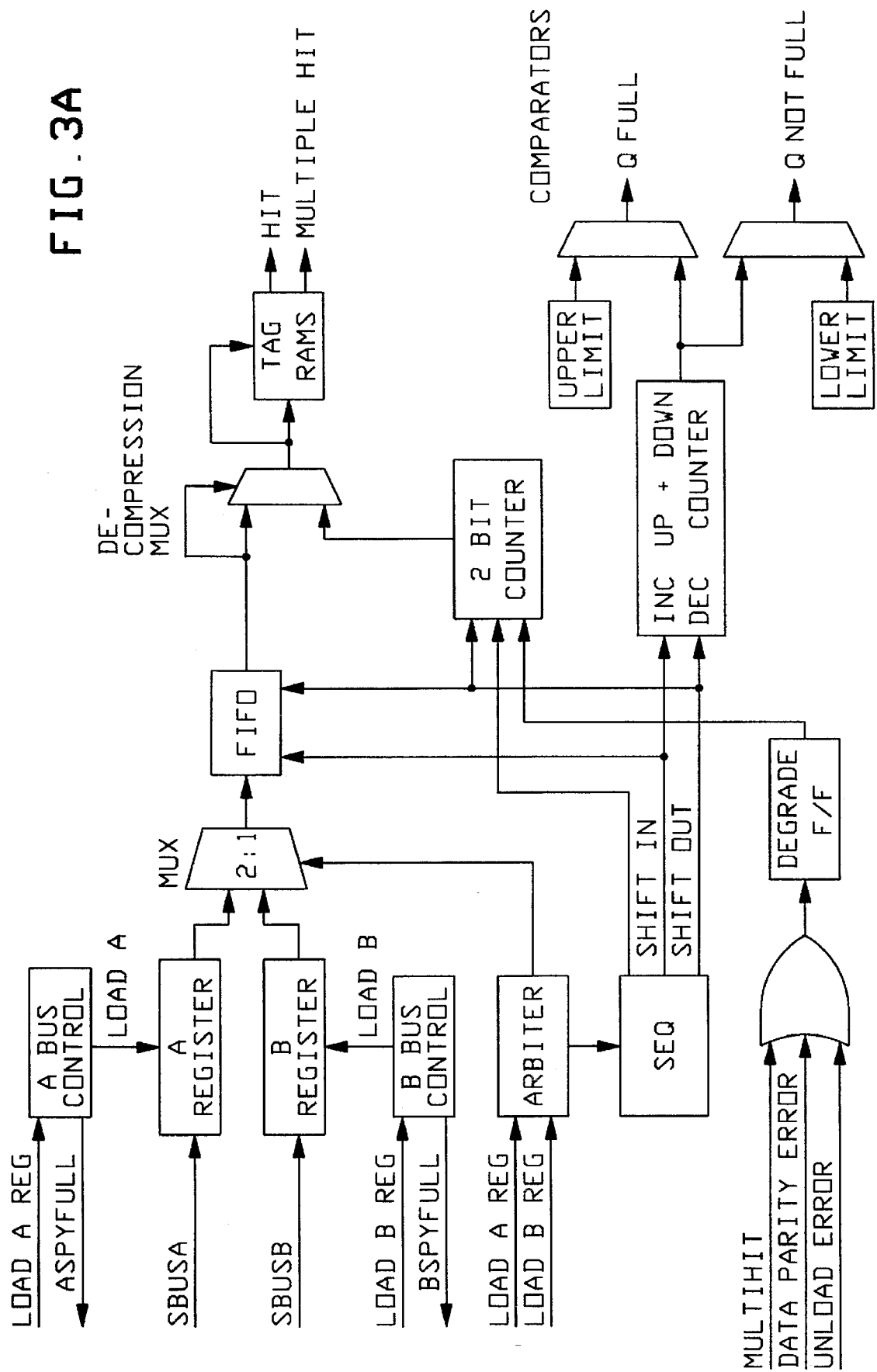
Figure 7:
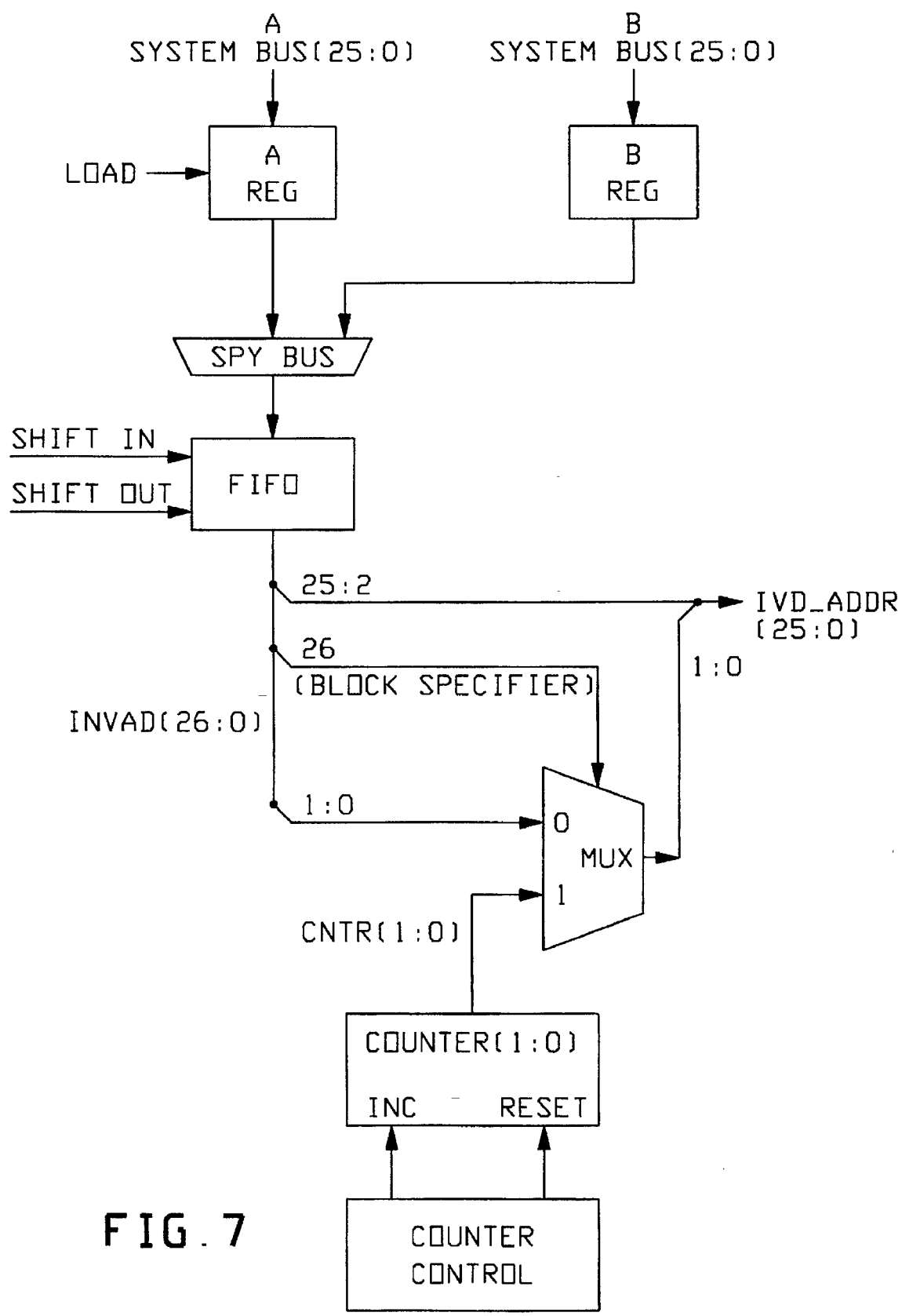
FIG. 7 is a block diagram of the "unload side" of such an Invalidation Queue FIFO; while FIG. 8 indicates Invalidation Address Mux selection.

FIG. 7 shows: the unload side of the "Invalidation Queue" FIFO. Here, it should be understood that the 26 bit invalidation address, IVD_ADDR(25:0), is derived from the information stored within the FIFO, and from an associated 2-bit counter. Bits (25:2) of the address remain the same whether for a "single word" type address or for a "block" type address. However, the lower two bits of the invalidation address differ depending upon the value of the "Block Specifier" (bit position 26 in FIG. 7). FIG. 3A is a related showing of an ASIC for one "Queue half".

[modified to include Spy-bus etc.; counter, etc., as in FIG. 7, plus Degrad F/F, etc.].

A multiplexer (MUX) selects the lower two bits for the invalidities address. If the "Block Selector" is a zero (a "single word" type), then the entire address, including the lower two bits, comes, out of the FIFO. If a "compressed" address emerges from the FIFO, (that is the "Block Selector" is a value of "one"), the lower two bits are derived from the counter.

Thus, a single position within the queue storage FIFO can give one of four values for the "Invalidations Address" when taken from the FIFO.

"BIT-SLICE" FEATURE

Referring back to FIG. 3, it can be seen that the cache module, including the "Invalidation Queue" structure under discussion, is preferably implemented using two ASIC gate arrays A-1, A-0. The arrays are identical and comprise two-halves of a complementary "bit-slice" structure. That is, one array handles one-half of the cache work, and the second array handles the other half. Each array processes ONLY certain "ID" bits that are configured at system initialization time. One array "passes" only data whose ID=0 (A-0); the other array only data whose ID=1 (A-1).

The "bit-sliced" array handling ID=0 (A-0) will handle all cache operations including invalidations with the least significant address bit=0. The other array (A-1, for ID= 1) will handle all cache work where the least significant address bit is "one".

With reference to FIG. 7 and the "compressed address" feature of our subject "Invalidation Queue", this "bit slice" feature is also affected. Each of the two arrays, (A-0, A-1, FIG. 3) only uses two of the four block addresses for a "compressed address". Array A-0 (ID=0) will count the lower two address bits as: 00 and 10. While array A-1 (ID=1) will count the lower two address bits as: 01 and 11. It can be seen here that, again, the least significant address bit corresponds with the array ID value.

This "bit slice" feature allows both cache arrays A-0, A-1 to do invalidating work simultaneously. Thus, for a "compressed block" type address, array A-0 handles two address values, while, simultaneously, the other array A-1, handles the other two address values of the block. This feature greatly enhances the efficient processing of invalidation addresses since four addresses can be processed in the time one would normally expect to process only two addresses.

Figure 8:
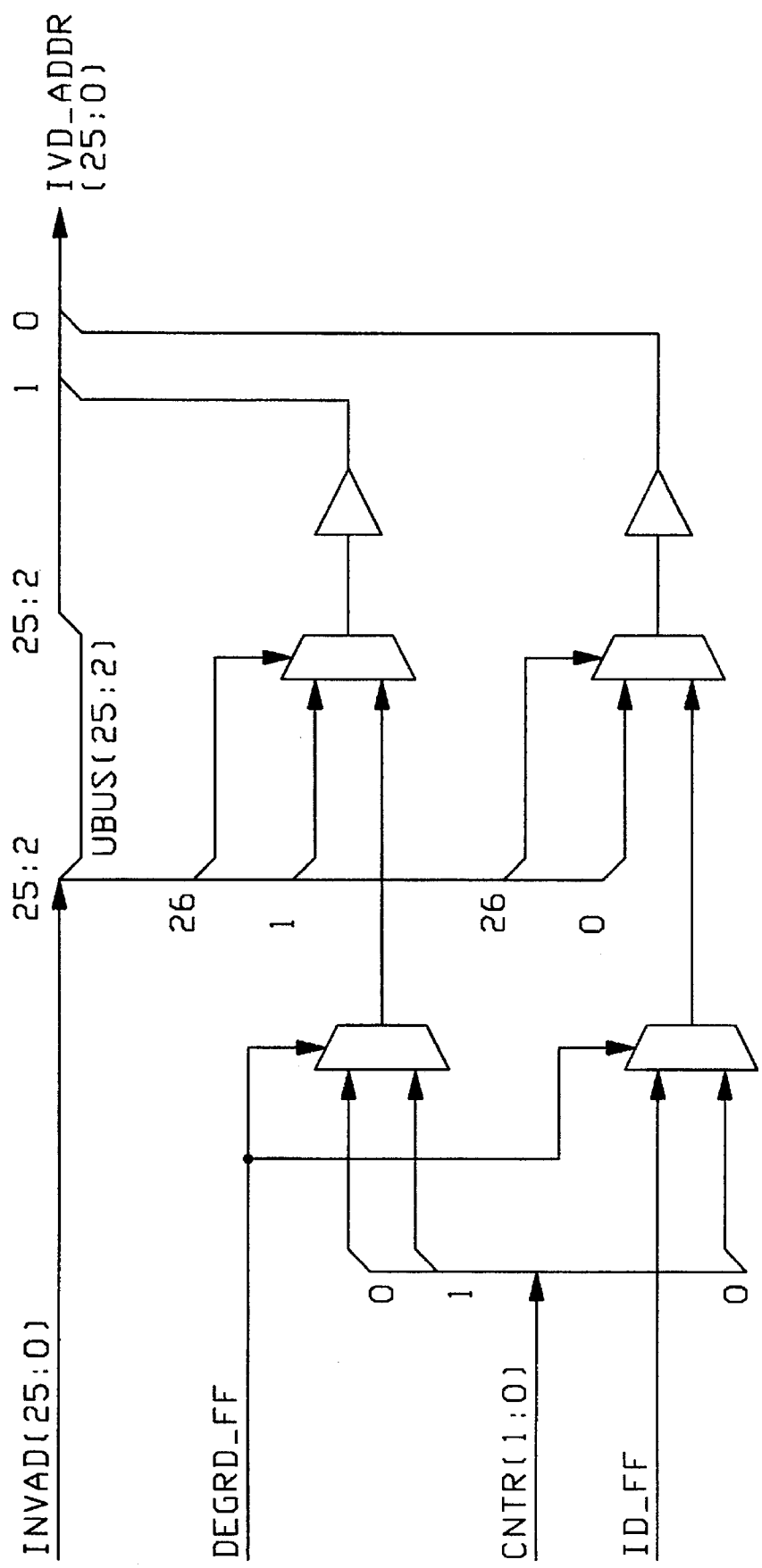

FIG. 8 shows the detailed logic for the multiplexors for the lower two address bits. Here, it will be understood that the invalidation bus from the FIFO, called INVAD(25:0), goes directly to become the actual invalidation address, called IVD_ADDR(25:0), except for the lower two bits which are derived from the multiplexors.

The identification bit for the array if seen here. It is called ID_FF. (A second signal, DEGRD_FF, called "degraded" will be discussed later.)

In normal operational modes (that is, with both arrays functioning normally), "bit-slicing" is fully operational. This is the case when DEGRD_FF is off; and the cache is said to not be "degraded." In this case, the second address bit, IVD_ADDR(1), gets the lowest bit of the counter, CNT(0). The lowest address bit, IVD_ADDR(0), gets the value of the ID_FF. It is seen that this causes each array to process addresses based upon their ID value and upon their least significant bit.

Because of the "bit slice/dual array", character of the cache, we also provide a special feature called "degraded" mode—whereby, if one of the arrays A-1, A-0 malfunctions (for example, parity errors detected in the cache tag RAMs), it takes itself off-line and a "degraded flip-flop," DEGRD_FF, (provided in each array) in the other array is set.

When the system is operating in "degraded mode," then there if only a single cache array available to handle all of the necessary cache work. Therefore, this array must handle all possible cache addresses. Hence, it can be seen from FIGS. 7 & 8 that, when DEGRD_FF is set, all four addresses of the compressed address block (00, 01, 10, and 11) must be multiplexed from the counter, CNTR(1:0), to the IVD_ADDR(25:0) lower two bit.

REPRISE

The ability to provide for "invalidation" of both "single word" type and "block type" system bus write operations in our special "Invalidation Queue" structure can greatly facilitate the performance of a processor/cache system.

Our "address compression" feature allows a block of (four) addresses to be held in a single position in the queue storage facility and allows many more operations to occur before the queue; can be "Filled". Since a "full" queue can degrade system performance, and can hinder a processor from doing other work, this compression feature also enhances system performance.

Our "bit-slice" feature allows a much larger cache to be used, as well as enhancing overall system performance; it allows (two) invalidations to take place simultaneously, (i.e. in two ASIC gate arrays A-1, A-0 forming our novel I.Q.) This feature also allows operations to continue even if a portion of the cache module malfunctions, e.g. via a "degrade mode" feature that allows a single array of the dual bit-slice ASIC pair to handle all the cache work itself.

More generally, this Invalidation Queue structure advantageously establishes (upper/lower) limit for associated indicators QUEUE-FULL, QUEUE-NOT FULL (e.g. developing optimum values as Queue is designed and tested). This allows one to tailor the optimum of such values as the Queue is developed, where this is not possible in design phase.

The invention here disclosed is a very general-purpose, very flexible, design. One that has been used very successfully in providing the cache for the Centrer Processing Module of the Unisys A-11, 411 processing system.

It will be understood that the preferred embodiments described herein are only exemplary, and that the invention is capable of many modifications and variations in construction, arrangement and use without departing from the spirit of the invention.

Modifications of the Invention are possible, for example the means and methods disclosed herein are also applicable to other like computer processor storage contexts, as well as to other related storage systems.

The above examples of possible variations of the present invention are merely illustrative. Accordingly, the present invention is to be considered as including all possible modifications and variations coming within the scope of the invention as defined by the appended claims.

What is claimed:

1. An Invalidation Queue (IQ) arrangement in a computer system having Main Memory means, Cache-Memory means and main-bus means therebetween, this IQ arrangement being adapted to assure identical data in all identical memory addresses, and in any cache, and being adapted to "remember" write-operations along said bus means and to execute invalidation sequences for any Cache-Memory means as dictated by that Cache-Memory means, said IQ arrangement comprising: an IQ unit disposed between each Cache-Memory and said main-bus means;

wherein each said IQ unit couples a Cache TAG RAM unit to said main bus means, and is "split" to comprise a pair of process-arrays, each array handling one-half the memory addresses and comprising external spy register means and a large ASIC gate array means including Degrade bistable storage means;

wherein each said spy register is a fast register disposed close to a respective main bus means and also provides resynchronization of the clock pulses of its main bus and in its cache memory means;

wherein each said gate array means includes a pair of input registers, outputted to MUX means, which in turn, is outputted to FIFO register means, which in turn, is outputted to a unload/check-logic stage, and where spy bus means is disposed between each said MUX means and said input register means.

2. The arrangement of claim 1, wherein said bistable storage means comprises flip-flop means.

* * * * *